US011762354B2

(12) United States Patent
Lee et al.

(10) Patent No.: US 11,762,354 B2
(45) Date of Patent: Sep. 19, 2023

(54) APPARATUS FOR CONTROLLING CHARGING OF ELECTRIC VEHICLE AND METHOD THEREFOR

(71) Applicants: HYUNDAI MOTOR COMPANY, Seoul (KR); KIA MOTORS CORPORATION, Seoul (KR); RESEARCH & BUSINESS FOUNDATION SUNGKYUNKWAN UNIVERSITY, Suwon-si (KR)

(72) Inventors: So Jin Lee, Suwon-si (KR); Ji Hwon Kim, Gwangmyeong-si (KR); Tae-Jin Lee, Suwon-si (KR); Yunmin Kim, Suwon-si (KR); Kyoung Min Kim, Seoul (KR); Kwanyoung Moon, Suwon-si (KR)

(73) Assignees: HYUNDAI MOTOR COMPANY, Seoul (KR); KIA MOTORS CORPORATION, Seoul (KR); RESEARCH & BUSINESS FOUNDATION SUNGKYUNKWAN UNI., Suwon-si (KR)

(*) Notice: Subject to any disclaimer, the term of this patent is extended or adjusted under 35 U.S.C. 154(b) by 335 days.

(21) Appl. No.: 17/022,797

(22) Filed: Sep. 16, 2020

(65) Prior Publication Data

US 2021/0088992 A1    Mar. 25, 2021

(30) Foreign Application Priority Data

Sep. 23, 2019  (KR) .................... 10-2019-0116929

(51) Int. Cl.
*G05B 19/042*  (2006.01)
*G06Q 10/02*  (2012.01)
*G06Q 20/14*  (2012.01)

(52) U.S. Cl.
CPC .......... *G05B 19/042* (2013.01); *G06Q 10/02* (2013.01); *G06Q 20/145* (2013.01); *G05B 2219/2639* (2013.01)

(58) Field of Classification Search
CPC ..................................................... G06Q 10/02
(Continued)

(56) References Cited

U.S. PATENT DOCUMENTS 10,293,699 B2    5/2019  Zhao et al.
10,710,467 B2 *  7/2020  Sawada ................... H02J 7/342
(Continued)

FOREIGN PATENT DOCUMENTS

JP    2010231258    *  3/2009  ............. Y02T 10/70
JP    5419759 B2    2/2014
(Continued)

*Primary Examiner* — Md Azad
(74) *Attorney, Agent, or Firm* — MCDONNELL BOEHNEN HULBERT & BERGHOFF LLP

(57) ABSTRACT

An apparatus for controlling charging of an electric vehicle and a method therefor are provided. The apparatus includes a communication device that performs vehicle-to-everything (V2X) communication with a charging station management server outside the electric vehicle and a vehicle management server configured to manage shared vehicles and a processor that requests the charging station management server to reserve a charging station via the communication device and automatically requests the vehicle management server to reserve a shared vehicle to be used when the electric vehicle is charged, via the communication device, when a vehicle power for driving to a destination is insufficient.

13 Claims, 10 Drawing Sheets

(58) Field of Classification Search
USPC .......................................................... 700/295
See application file for complete search history.

(56) References Cited

U.S. PATENT DOCUMENTS

| | | | |
|---|---|---|---|
| 2012/0233077 A1* | 9/2012 | Tate, Jr. ................. | G06Q 10/20 |
| | | | 705/65 |
| 2018/0222340 A1 | 8/2018 | Zhao et al. | |
| 2018/0361870 A1* | 12/2018 | Zhao ....................... | B60L 53/68 |
| 2019/0139162 A1* | 5/2019 | Sawada .................. | G06Q 10/02 |
| 2019/0386502 A1* | 12/2019 | Penilla .................... | H02J 50/90 |
| 2020/0160478 A1* | 5/2020 | Ramot ................. | G01C 21/343 |

FOREIGN PATENT DOCUMENTS

| | | |
|---|---|---|
| JP | 6184735 B2 | 8/2017 |
| KR | 2013-0082957 A | 7/2013 |
| KR | 10-1321019 B1 | 10/2013 |

* cited by examiner

APPARATUS FOR CONTROLLING CHARGING OF ELECTRIC VEHICLE AND METHOD THEREFOR

CROSS REFERENCE TO RELATED APPLICATIONS

This application claims the benefit of priority to Korean Patent Application No. 10-2019-0116929, filed in the Korean Intellectual Property Office on Sep. 23, 2019, the entire contents of which are incorporated herein by reference.

TECHNICAL FIELD

The present disclosure relates to an apparatus for controlling charging of an electric vehicle and a method therefore, and more particularly, relates to technologies of continuing operation in a situation where a power of the electric vehicle is insufficient.

BACKGROUND

Recently, to address problems such as global warming due to carbon excessive emissions, there has been a growing interest in electric vehicles and hybrid vehicles, and they have been developed to reduce carbon emissions.

In general, an electric vehicle (EV) refers to a car which uses its battery and motor without using petroleum-based fuels and an engine. Such an electric vehicle may operate using electrical energy charged in its battery, as the battery loaded into the electric vehicle is charged by a general charging system in the parked state. When it is necessary to charge the battery when the electric vehicle operates, a driver of the electric vehicle should visit a charging station to charge the battery. However, unlike a general car which uses oil as fuel, it takes a relatively long time for the electric vehicle to charge the battery.

Thus, when many electric vehicles are charging their batteries in a specific charging station, when many electric vehicles wait for charging their batteries, or when there are many electric vehicles to visit the charging station to charge their batteries, the electric vehicle which visits the charging station could wait for a long time to charge its battery.

Thus, the disconnection of operation due to the charging of the electric vehicle results in inconvenience of a user of the electric vehicle.

SUMMARY

The present disclosure has been made to solve the above-mentioned problems occurring in the prior art while advantages achieved by the prior art are maintained intact.

An aspect of the present disclosure provides an apparatus for controlling charging of an electric vehicle to continue operation by reserving a charging station and reserving a shared vehicle when a power of the electric vehicle is insufficient and causing a user to transfer to the reserved shared vehicle to move to the destination without waiting during a charging time and a method therefor.

The technical problems to be solved by the inventive concept are not limited to the aforementioned problems, and any other technical problems not mentioned herein will be clearly understood from the following description by those skilled in the art to which the present disclosure pertains.

According to an aspect of the present disclosure, an apparatus for controlling charging of an electric vehicle may include a communication device that performs vehicle-to-everything (V2X) communication with a charging station management server outside the electric vehicle and a vehicle management server configured to manage shared vehicles and a processor that requests the charging station management server to reserve a charging station via the communication device and automatically requests the vehicle management server to reserve a shared vehicle to be used when the electric vehicle is charged, via the communication device, when a vehicle power for driving to a destination is insufficient.

In an embodiment, the processor may transmit one of the destination, a vehicle path, a road environment, traffic volume, an estimated time of arrival, a battery state, a charging type, information about the charging station, fee information, or payment type information to the charging station management server, may request the charging station management server to perform one of the reservation of the charging station, a change in the reservation of the charging station, or cancellation of the reservation of the charging station, and may transmit one of the destination, the vehicle path, the road environment, the traffic volume, the estimated time of arrival, the battery state, information about the shared vehicle, the fee information, or the payment type information to the vehicle management server.

In an embodiment, the processor may request the vehicle management server to perform one of the reservation of the shared vehicle, a change in the reservation of the shared vehicle, or cancellation of the reservation of the shared vehicle using one of the destination, a vehicle path, a road environment, traffic volume, an estimated time of arrival, a battery state, information about the shared vehicle, fee information, or a payment type.

In an embodiment, the processor may perform path guidance or driving control to the reserved charging station, when receiving information about the reservation of the charging station from the charging station management server.

In an embodiment, the processor may establish a session with a charging station terminal in the charging station to share information necessary for wireless charging and may share the information necessary for the wireless charging with the charging station terminal through the established session.

In an embodiment, the processor may share charging state information with the charging station terminal, when the electric vehicle arrives at the reserved charging station to charge the electric vehicle, and may receive metering information from the charging station terminal.

In an embodiment, the processor may establish a session with a sharing space terminal in a car sharing space, when receiving information about the shared vehicle from the vehicle management server, and may share the information about the shared vehicle with the sharing space terminal through the established session.

In an embodiment, the processor may perform path guidance or driving control where the reserved car sharing space is the destination, when receiving information about the reservation of the shared vehicle from the vehicle management server.

In an embodiment, the processor may share information about use of the shared vehicle, which arrives at the car sharing space, with the vehicle management server, when the electric vehicle arrives at the car sharing space to change to the shared vehicle, and may receive metering information from the vehicle management server.

According to another aspect of the present disclosure, a method for controlling charging of an electric vehicle may include receiving a request to reserve a charging station from the electric vehicle and reserving the charging station based on driving information of the electric vehicle and information about the charging station.

In an embodiment, the reserving of the charging station may include periodically collecting information about charging stations, selecting a charging station terminal based on the driving information and the information about the charging station, when the driving information is received from the electric vehicle, and providing the electric vehicle with information about the selected charging station terminal.

In an embodiment, the method may further include automatically changing or canceling the reservation of the charging station depending on one of a destination, a vehicle path, a road environment, traffic volume, an estimated time of arrival, a battery state, a charging type, information about the charging station, fee information, or a payment type.

According to another aspect of the present disclosure, a method for controlling charging of an electric vehicle may include receiving a request to reserve a shared vehicle from an electric vehicle and reserving the shared vehicle based on driving information of the electric vehicle and information about the shared vehicle.

In an embodiment, the reserving of the shared vehicle may include periodically collecting information about shared vehicles, selecting a shared vehicle based on the driving information and the information about the charging station, when the driving information is received from the electric vehicle, and sharing information about the selected shared vehicle with the electric vehicle or a charging station.

In an embodiment, the method may further include automatically changing or canceling the reservation of the shared vehicle depending on one of a destination, a vehicle path, a road environment, traffic volume, an estimated time of arrival, a battery state, information about the shared vehicle, fee information, or a payment type.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Figure 1:
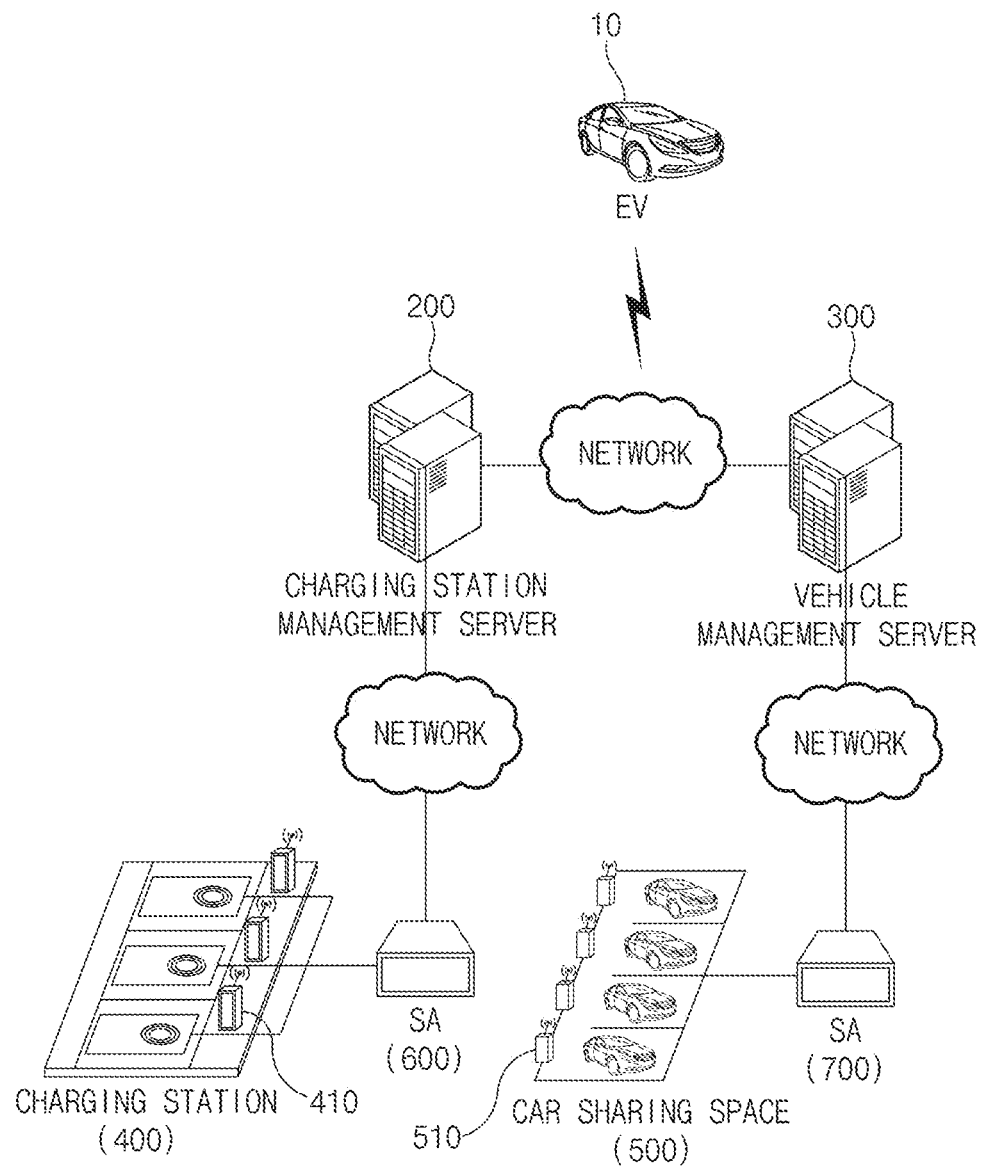
FIG. 1 is a drawing illustrating a configuration of a vehicle charging system for continuing operation of an eco-friendly vehicle according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

An embodiment of the present disclosure discloses technologies of allowing a vehicle to request a charging station management server and a vehicle management server to continue operation, when power to a destination is insufficient during operation, causing the vehicle to arrive at a reserved charging station to charge the vehicle, and causing a user to transfer from the vehicle to a reserved shared vehicle to continue moving to the destination.

Hereinafter, embodiments of the present disclosure will be described in detail with reference to FIGS. 1 to 10.

Figure 2:
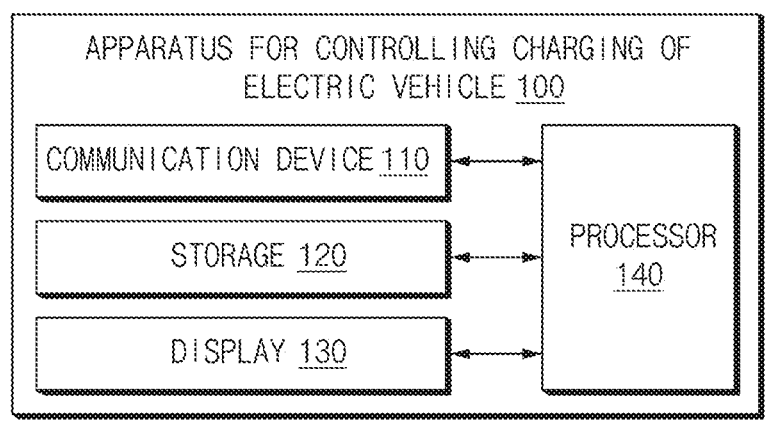
FIG. 2 is a block diagram illustrating a detailed configuration of an apparatus for controlling charging of an electric vehicle according to an embodiment of the present disclosure.

FIG. 1 is a drawing illustrating a configuration of a vehicle charging system for continuing operation of an eco-friendly vehicle according to an embodiment of the present disclosure. FIG. 2 is a block diagram illustrating a detailed configuration of an apparatus for controlling charging of an electric vehicle according to an embodiment of the present disclosure.

Referring to FIG. 1, the vehicle charging system according to an embodiment of the present disclosure may include an electric vehicle 10, a charging station management server 200, and a vehicle management server 300. The electric vehicle 10 may communicate with the charging station management server 200 and the vehicle management server 300, may reserve a charging station terminal 410 of a charging station 400 for continuing operation of the electric vehicle 10, and may reserve a shared vehicle of a car sharing space 500, such that a user of the electric vehicle 10 continues moving to a destination using the reserved shared vehicle without waiting while the electric vehicle 10 is charged in the charging station 400. In this case, the charging station 400 and the car sharing space 500 may be connected over a network and gateways 600 and 700. The charging station 400 may access the network via the charging station terminal 410 and the car sharing space 500 may access the network via a sharing space terminal 510 to transmit and receive information necessary for charging. In other words, when receiving a charging information request, a charging station reservation request, and the like from the electric vehicle 10, the charging space terminal 410 may provide the electric vehicle 10 with charging station information and charging station reservation information. When receiving a shared vehicle information request and a sharing space reservation request from the electric vehicle 10, the sharing space terminal 510 may provide the electric vehicle 10 with the shared vehicle information and the sharing space reservation information. When a vehicle power for driving to a destination is insufficient, the electric vehicle 10 may automatically request to reserve a charging station and a shared vehicle. The electric vehicle 10 may perform vehicle-to-everything (V2X) communication and vehicle-to-grid (V2G) communication with the charging station management server 200 and the vehicle management server 300. In this case, the V2X communication is a technology of sharing information with a vehicle or a surrounding communication infrastructure for the purpose of providing a user with safety and convenience, which may define data transmission and reception for the V2X communication in IEEE 802.11p, and may define an application message for the V2X communication in SAE J2735. Furthermore, the V2G communication is a technology of adjusting supply according to electric power demand through a connection of a power grid network with an electric vehicle or a charging station, which may define a communication protocol for managing a charging station which is one of energy storages on a power network in IEC 61850.

Furthermore, the electric vehicle 10 according to an embodiment of the present disclosure may perform wireless charging from the charging station terminal 410 of the charging station 400, may share information between the electric vehicle 10 and the charging station terminal 410 for wireless charging, and may be implemented based on a communication protocol for sharing a payment/charging type or the like for wireless charging of the electric vehicle 10 defined in ISO 15118.

When receiving a charging station reservation request from the electric vehicle 10, the charging station management server 200 may reserve a charging station based on driving information and charging station information, which are received from the electric vehicle 10.

In this case, the driving information may include at least one of a destination, a vehicle path, a battery state, a charging type, an estimated time of arrival of the vehicle, or an amount of necessary power. The charging station information may include at least one of a location of a charging station, charging reservation information, a supported charging type, or a charging time.

The charging station management server 200 may automatically change or cancel the reservation of the charging station depending on one of a destination, a road environment, traffic volume, an estimated time of arrival, or information about the charging station.

The charging station management server 200 may store and manage information about a charging station as shown in Table 1 below.

TABLE 1

DATABASE OF CHARGING STATION MANAGEMENT SERVER

| | CHARGING DEVICE | CHARGING TYPE | PERMITTED VOLTAGE | PERMITTED CURRENT |
|---|---|---|---|---|
| CHARGING STATION A | 1 | WIRELESS | 220 V | 30 A |
| | 2 | WIRELESS | 220 V | 32 A |
| | 3 | WIRELESS | 220 V | 32 A |
| CHARGING STATION INFORMATION | | | | |

When receiving a shared vehicle reservation request from the electric vehicle 10, the vehicle management server 300 may reserve a shared vehicle based on driving information and information about the shared vehicle, which are received from the electric vehicle 10. In this case, the information about the shared vehicle may include at least one of a battery state, a usage time, or driving information of the shared vehicle.

The vehicle management server 300 may automatically change or cancel the reservation of the shared vehicle depending on one of a destination, a road environment, traffic volume, an estimated time of arrival, occurrence of a vehicle breakdown, or information about an available shared vehicle.

When receiving a shared vehicle reservation request from the electric vehicle 10, the vehicle management server 300 may reserve a shared vehicle of a sharing space located within a predetermined distance from the charging station reserved by the electric vehicle 10.

The vehicle management server 300 may store and manage information about shared vehicles as shown in Table 2 below.

TABLE 2

DATABASE OF VEHICLE MANAGEMENT SERVER

| | SHARED VEHICLE ID | POWER STATE | USAGE TIME |
|---|---|---|---|
| CAR SHARING SPACE A | 1 | 70% | 5 hr |
| | 2 | 45% | 7 hr |
| | 3 | 95% | 1 hr |
| | 4 | 76% | 4 hr |
| SHARED VEHICLE INFORMATION | | | |

An example where the charging station management server 200 and the vehicle management server 300 are separately implemented is disclosed in FIG. 1, but not limited thereto. The charging station management server 200 and the vehicle management server 300 may be implemented to be integrated into one server. Furthermore, the charging station 400 and the car sharing space 500 may be implemented on be located on the same place or within a close distance where a user is able to walk. Alternatively, the vehicle management server 300 may select and reserve a shared vehicle of a car sharing space located within a predetermined distance from a reserved charging space.

The vehicle charging system according to an embodiment of the present disclosure may ensure continuity of driving to a destination through reservation of the charging station 400 and the shared vehicle. The electric vehicle 10 may reserve the charging station terminal 410 of the charging station 400 through V2X communication without recognition of the user to perform power management.

Furthermore, the vehicle charging system according to an embodiment of the present disclosure may reserve a charging station and may reserve a shared vehicle causing the user to continuously move to a destination. When the electric vehicle 10 arrives at the charging station to start to charge the electric vehicle 10, the user may move to the destination using the reserved shared vehicle.

Referring to FIG. 2, when vehicle power for driving to a destination is insufficient, an apparatus 100 for controlling charging of an electric vehicle according to an embodiment of the present disclosure may request the charging station management server 200 to reserve a charging station and may automatically request the vehicle management server 300 to reserve a shared vehicle to be used when charging the electric vehicle 10. In this case, the apparatus 100 for controlling charging of the electric vehicle may be loaded into the electric vehicle 10 or may be a user terminal of a passenger who rides in the electric vehicle 10. When the apparatus 100 for controlling charging of the electric vehicle is the user terminal of the passenger, it may communicate with the electric vehicle 10 to receive information about the electric vehicle 10. The apparatus 100 for controlling charging of the electric vehicle may include a communication device 110, a storage 120, a display 130, and a processor 140.

The communication device 110 may be a hardware device implemented with various electronic circuits to transmit and receive a signal through a wireless or wired connection. In an embodiment of the present disclosure, the communication device 110 may perform V2X communication, V2G communication, wireless charging communication, or the like with the charging station management server 200, the vehicle management server 300, or the like outside the electric vehicle 10. As an example, the communication device 110 may receive information, such as a charging power of a reserved shared vehicle, a number of the shared vehicle, or a location of a car sharing space where the shared vehicle is parked, from the vehicle management server 300. The storage 120 may store charging station reservation information and shared vehicle information received from the charging station management server 200 and the vehicle management server 300 outside the electric vehicle 10. The storage 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The display 130 may display information about a reserved charging station, information about a shared vehicle, and the like, may display a movement path to a destination, or may display changed reservation information. As an example, the display 130 may display a charging power of a reserved shared vehicle, a number of the shared vehicle, a location of a car sharing space where the shared vehicle is parked, or the like.

The display 130 may be implemented as a head-up display (HUD), a cluster, an audio video navigation (AVN), or the like. Furthermore, the display 130 may include one of a liquid crystal display (LCD), a thin film transistor-LCD (TFT-LCD), a light emitting diode (LED) display, an organic LED (OLED) display, an active matrix OLED (AMOLED) display, a flexible display, a bended display, or a three-dimensional (3D) display. Some thereof may be implemented as transparent displays configured as a transparent type or a semi-transparent type to see the outside. Moreover, the display 130 may be implemented as a touchscreen including a touch panel to be used as an input device other than an output device.

The processor 140 may be electrically connected with the communication device 110, the storage 120, the display 130, or the like and may electrically control the respective components. The processor 140 may be an electrical circuit which executes instructions of software and may perform a variety of data processing and calculation described below.

When vehicle power for driving to a destination is insufficient, the processor 140 may request the charging station management server 200 to reserve a charging station via the communication device 110 and may automatically request the vehicle management server 300 to reserve a shared vehicle to be used when charging the electric vehicle 10 via the communication device 110.

The processor 140 may support an application for autonomous driving and navigation, may set a vehicle path and an estimated time of arrival using one of a destination, a road environment, or traffic volume to display the vehicle path and the estimated time of arrival on the display 130, and may use the vehicle path and the estimated time of arrival for requesting to reserve a charging station and a shared vehicle.

The processor 140 may request the charging station management server 200 to perform one of reservation of a charging station, a change in the reservation of the charging station, or cancellation of the reservation of the charging station using one of a destination, a vehicle path, a road environment, traffic volume, an estimated time of arrival, a battery state, a charging type, information about the charging station, fee information, or payment type information. In this case, when requesting the charging station management server 200 to perform one of the reservation of the charging station, the change in the reservation of the charging station, or the cancellation of the reservation of the charging station, the processor 140 may transmit one of the destination, the vehicle path, the road environment, the traffic volume, the estimated time of arrival, the battery state, the charging type, the information about the charging station, the fee information, or the payment type information to the charging station management server 200. The charging station management server 200 may perform one of the reservation of the charging station, the change in the reservation of the charging station, or the cancellation of the reservation of the charging station using one of the destination, the vehicle path, the road environment, the traffic volume, the estimated time of arrival, the battery state, the charging type, the information about the charging station, the fee information, or the payment type information, which is received from the processor 140 of the electric vehicle 10.

The processor 140 may request the vehicle management server 300 to perform one of reservation of a shared vehicle, a change in the reservation of the shared vehicle, or cancellation of the reservation of the shared vehicle using one of a destination, a vehicle path, a road environment, traffic volume, an estimated time of arrival, a battery state, information about the shared vehicle, fee information, or a payment type.

When receiving information about the reservation of the charging station and information about reservation change/cancellation from the charging station management server 200, the processor 140 may perform path guidance or driving control to the reserved charging station.

The processor 140 may establish a session with the charging station terminal 410 in the charging station to share information necessary for wireless charging and may share the information necessary for the wireless charging with the charging station terminal 410 through the established session. In this case, the information necessary for the wireless charging may include a battery state, a requested amount of charging, a time required for charging, a maximum voltage, a maximum current, a minimum current, or the like.

When the electric vehicle 10 arrives at a reserved charging station to charge the electric vehicle 10, the processor 140 may share information about a charging state with the charging station terminal 410 and may receive metering information from the charging station terminal 410. In this case, the metering information may include the amount of power and information about a usage fee.

When receiving information about a shared vehicle from the vehicle management server 300, the processor 140 may establish a session with the sharing space terminal 510 in the car sharing space 500 and may share the information about the shared vehicle with the sharing space terminal 510 through the established session.

When the shared vehicle is used, the processor 140 may receive metering information including fee information about the shared vehicle from the vehicle management server 300. The wireless charging of the electric vehicle 10 and the payment of the fee for use of the shared vehicle by the driver may be automatically performed by wireless communication without awareness of the driver before the driver arrives at the final destination. Furthermore, when server interworking between a wireless charging service provider and a car sharing service provider is performed, it is able to perform unified fee payment.

When a destination is entered before the electric vehicle 10 starts or when power to the destination is insufficient while the electric vehicle 10 is traveling, the apparatus 100 for controlling of charging of the electric vehicle 10 may request the charging station management server 200 and the vehicle management server 300 to reserve a charging station and a shared vehicle to continue operation. When the reservation of the charging station and the shared vehicle is completed by the charging station management server 200 and the vehicle management server 300, the electric vehicle 10 may arrive at the reserved charging station to perform wireless charging. A user of the electric vehicle 10 may move to the shared vehicle located on a sharing space near the charging station without waiting during a charging time and may transfer from the electric vehicle 10 to the shared vehicle to continue moving to the destination.

As such, in an embodiment of the present disclosure, the user may transfer to the reserved shared vehicle to move to the destination, without waiting during a charging time of the electric vehicle. Furthermore, an embodiment of the present disclosure may autonomously change or cancel the reservation of a charging station or a shared vehicle in response to a change in situation such as a change in destination or a change in estimated time of arrival and may change the shared vehicle to a new shared vehicle depending on a breakdown of the shared vehicle or a change in road environment in the process of using the shared vehicle to ensure continuity of operation. In other words, an embodiment of the present disclosure may flexibly correspond to various situation changes capable of occurring in the driving process.

Figure 3:
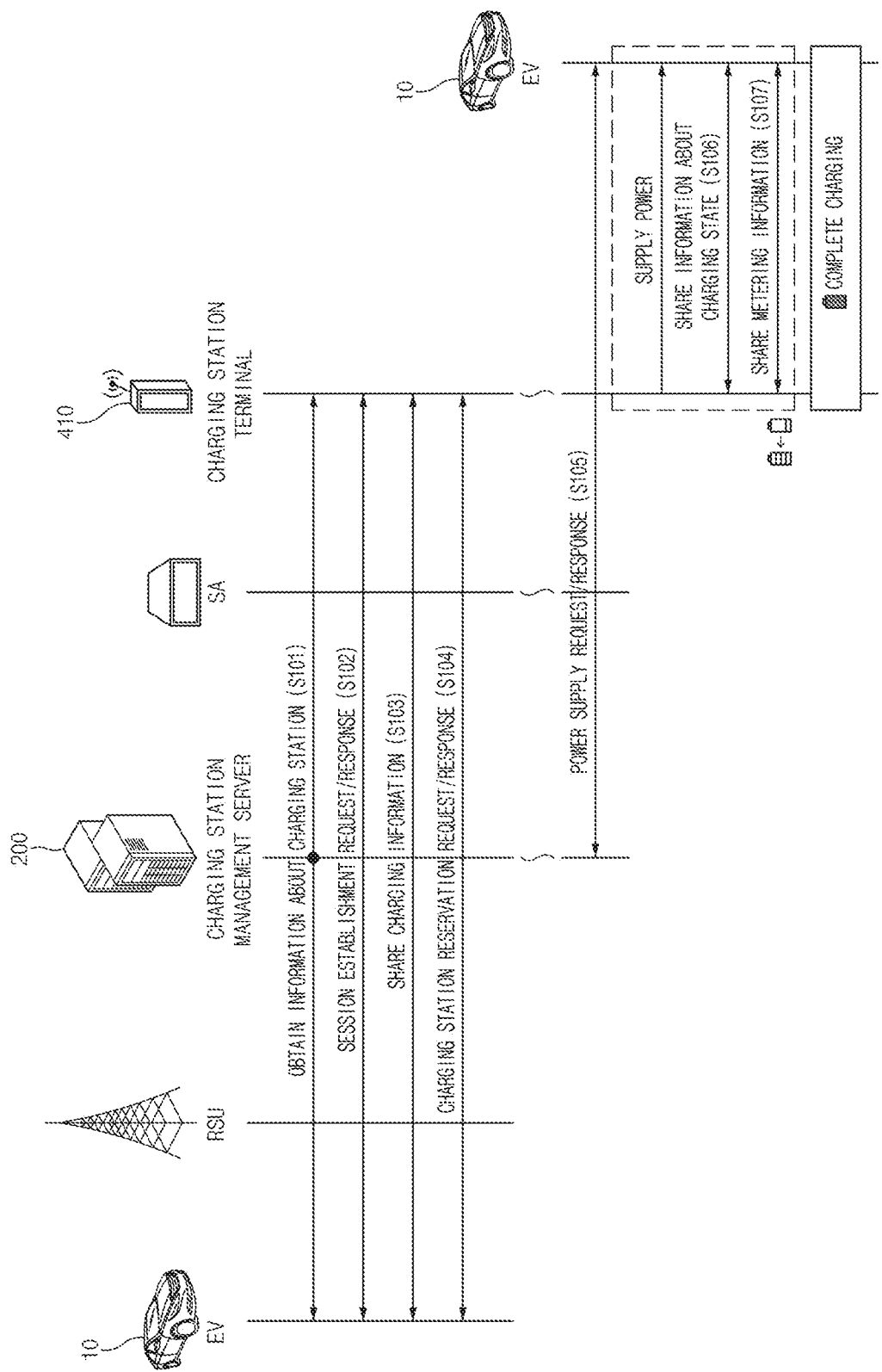
FIG. 3 is a signal sequence diagram illustrating a method for reserving a charging station in an electric vehicle according to an embodiment of the present disclosure.

Hereinafter, a description will be given of a method for reserving a charging station in an electric vehicle according to an embodiment of the present disclosure with reference to FIG. 3. FIG. 3 is a signal sequence diagram illustrating a method for reserving a charging station in an electric vehicle according to an embodiment of the present disclosure.

Hereinafter, it may be assumed that an operation described as being performed by an electric vehicle 10 of FIG. 1 is performed by an apparatus 100 for controlling changing of an electric vehicle, which is loaded into the electric vehicle 10. Furthermore, an operation described as being performed by the electric vehicle 10 may be understood as being controlled by a processor 140 of the apparatus 100 for controlling charging of the electric vehicle.

Referring to FIG. 3, in S101, a charging station management server 200 may periodically communicate with a charging station terminal 410 to collect and manage information about a charging station and may transmit the information about the charging station, such as a location of the charging station, an ID of the charging station, a charging type, fee information, a payment type, a location of a charging station terminal, an ID of the charging station terminal, or charging station reservation information, to the electric vehicle 10.

In S102, the electric vehicle 10 may request a charging station terminal 410 to establish a session to share information necessary for wireless charging with the charging station terminal 410 and the charging station 410 may respond to the request by issuing a session ID.

In S103, the electric vehicle 10 may share charging information necessary for wireless charging, for example, a battery state, a requested amount of charging, a time taken for charging, a maximum voltage, a maximum current, or a minimum current, with the charging station terminal 410 and may request a charging station 400 to reserve charging based on the charging information. Thus, in S104, the charging station terminal 410 may respond to grant the reservation. In this case, when a destination is entered from a user, the electric vehicle 10 may calculate an amount of power necessary to the destination. When the amount of power necessary to the destination is greater than the current capacity of the battery of the electric vehicle 10 (when a power of the electric vehicle 10 is insufficient), the electric vehicle 10 may request to reserve a charging station and a shared vehicle.

Thereafter, in S105, the electric vehicle 10 may arrive at the charging station 400 and may request the charging station terminal 410 to supply power based on the reserved information and the charging station terminal 410 may identify the reservation of the electric vehicle 10 to notify the electric vehicle 10 of preparation for supplying power.

In S106, the electric vehicle 10 may receive as much power as it needs to be suitable for its characteristic through information necessary for wireless charging, which is previously exchanged, and may share charging state information with the charging station terminal 410. Thereafter, in S107, the charging station terminal 410 may share the supplied amount of power and metering information including fee information with the electric vehicle 10.

As such, when a vehicle power for driving to a destination is insufficient, the electric vehicle 10 according to an embodiment of the present disclosure may automatically request the charging station management server 200 to reserve a charging station and a shared vehicle. When receiving the request to reserve the charging station from the electric vehicle 10, the charging station management server 200 may reserve the charging station based on information about driving of the electric vehicle 10 and the information about the charging station.

Receiving the request to reserve the charging station, the charging station management server 200 may periodically collect information about a charging station, may select an optimal charging station terminal based on the driving information, which is received together with the request to reserve the charging station from the electric vehicle 10, and the information about the charging station, and may provide the electric vehicle 10 with information about the selected charging station terminal. Thus, the electric vehicle 10 may guide the route to the reserved (selected) charging station or may perform automatic driving control. To this end, the electric vehicle 10 may further include a navigation device (not shown) or an automatic driving controller (not shown).

Furthermore, the charging station management server 200 may automatically change or cancel the reservation of the charging station depending on one of a destination, a vehicle path, a road environment, traffic volume, an estimated time of arrival, a battery state, a charging type, information about the charging station, fee information, or a payment type and may automatically change or cancel the reservation of the charging station depending on the request of the electric vehicle 10. In other words, the electric vehicle 10 may request the charging station management server 200 to automatically change or cancel the reservation of the charging station depending on one of a destination, a vehicle path, a road environment, traffic volume, an estimated time of arrival, a battery state, a charging type, information about the charging station, fee information, or a payment type.

Figure 4:
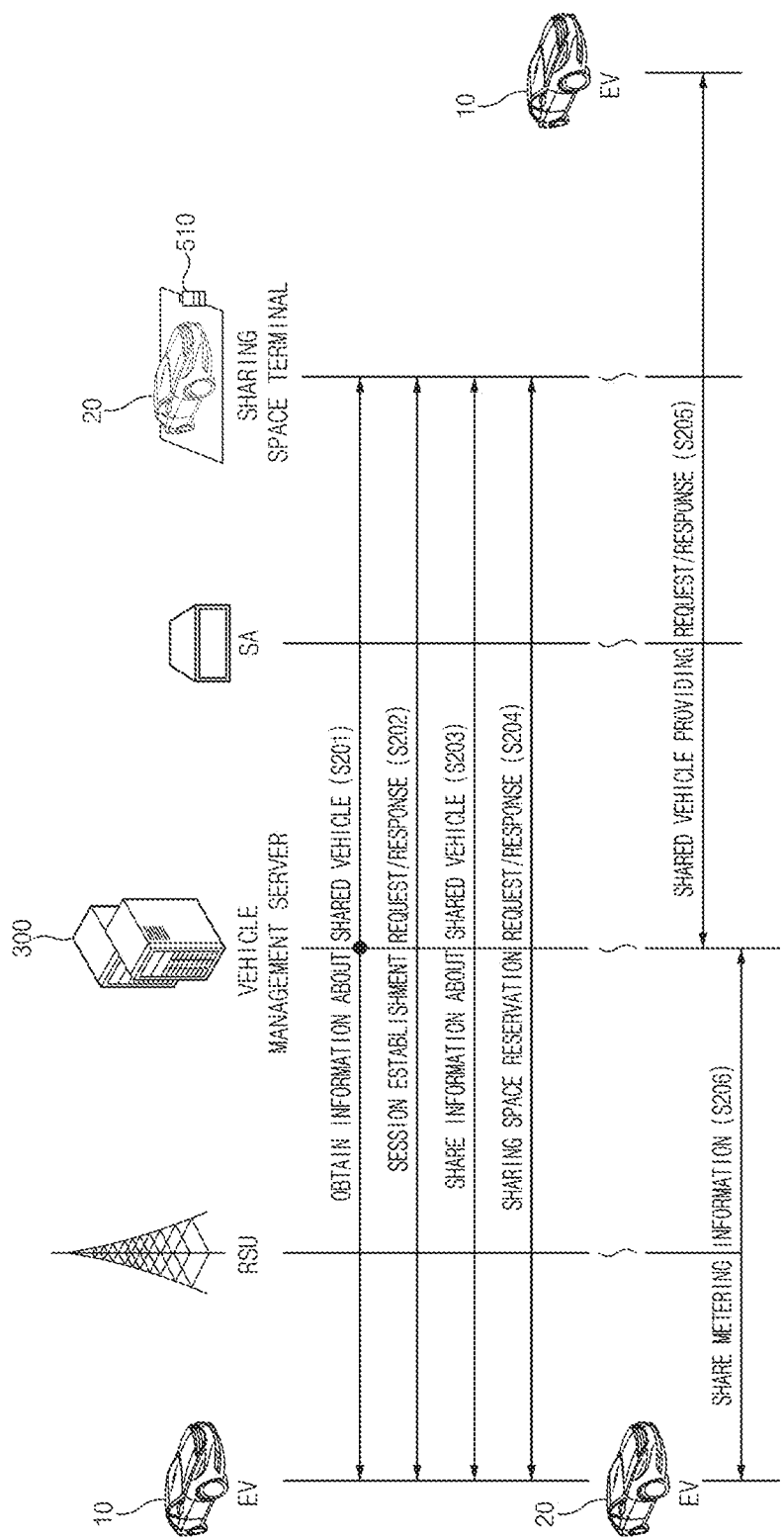
FIG. 4 is a signal sequence diagram illustrating a method for reserving a shared vehicle in an electric vehicle according to an embodiment of the present disclosure.

Hereinafter, a description will be given of a method for reserving a shared vehicle in an electric vehicle according to an embodiment of the present disclosure with reference to FIG. 4. FIG. 4 is a signal sequence diagram illustrating a method for reserving a shared vehicle in an electric vehicle according to an embodiment of the present disclosure. Hereinafter, it may be assumed that an operation described as being performed by an electric vehicle 10 of FIG. 1 is performed by an apparatus 100 for controlling changing of an electric vehicle, which is loaded into the electric vehicle 10. Furthermore, an operation described as being performed by the electric vehicle 10 may be understood as being controlled by a processor 140 of the apparatus 100 for controlling charging of the electric vehicle.

Referring to FIG. 4, in S201, a vehicle management server 300 may periodically collect and manage information about a shared vehicle, such as a location of the shared vehicle, an ID of the shared vehicle, fee information, a payment type, a battery state of the shared vehicle, a type of the shared vehicle, riding capacity of the shared vehicle, or reservation information of the shared vehicle, from a sharing space terminal 510 and may transmit the information about the shared vehicle to the electric vehicle 10.

In S202, the electric vehicle 10 may establish a session to share information about a sharing space and the information about the shared vehicle collected from the sharing space terminal 510 and the vehicle management server 300 and may issue a session ID to respond.

In S203, the electric vehicle 10 may share the information about the shared vehicle with the sharing space terminal 510.

In S204, the electric vehicle 10 may request the sharing space terminal 510 to reserve the shared vehicle based on the information about the shared vehicle shared with the sharing space terminal 510 and the sharing space terminal 510 may respond to the request to grant the reservation. The electric vehicle 10 may determine whether a vehicle power for driving to a destination is insufficient. When the vehicle power is insufficient, the electric vehicle 10 may automatically request to reserve a charging station and a shared vehicle.

Thereafter, in S205, the electric vehicle 10 may request the sharing space terminal 510 to reserve the shared vehicle based on information reserved in a sharing space and the sharing space terminal 510 may identify the reservation of the shared vehicle and may notify the electric vehicle 10 of preparation for providing the shared vehicle.

A driver may transfer to the shared vehicle 20 to start to drive. In S206, the shared vehicle 20 may share metering information including a usage fee with the vehicle management server 300 to update usage information in a movement process.

As such, when a vehicle power for driving to a destination is insufficient, the electric vehicle 10 according to an embodiment of the present disclosure may automatically request the vehicle management server 300 to reserve a charging station and a shared vehicle. When receiving the request to reserve the charging station from the electric vehicle 10, the vehicle management server 300 may reserve the shared vehicle based on driving information of the electric vehicle 10 and the information about the shared vehicle.

The vehicle management server 300 may periodically collect information about the shared vehicle. When receiving driving information from the electric vehicle 10, the vehicle management server 300 may select an optimal shared vehicle among a plurality of available shared vehicles based on the driving information and the information about the shared vehicle. Thus, the vehicle management server 300 may share information about the selected shared vehicle with one of the electric vehicle 10, the charging station terminal 410, or the charging station management server 200.

Furthermore, the vehicle management server 300 may automatically change or cancel the reservation of the shared vehicle depending on one of a destination, a road environment, traffic volume, an estimated time of arrival, occurrence of a vehicle breakdown, information about an available shared vehicle, fee information, or a payment type and may automatically change or cancel the reservation of the shared vehicle depending on a request of the electric vehicle 10. In other words, the electric vehicle 10 may request to the vehicle management server 300 to automatically change or cancel the reservation of the shared vehicle depending on one of a destination, a vehicle path, a road environment, traffic volume, an estimated time of arrival, a battery state, occurrence of a vehicle breakdown, or information about the shared vehicle.

Figure 5:
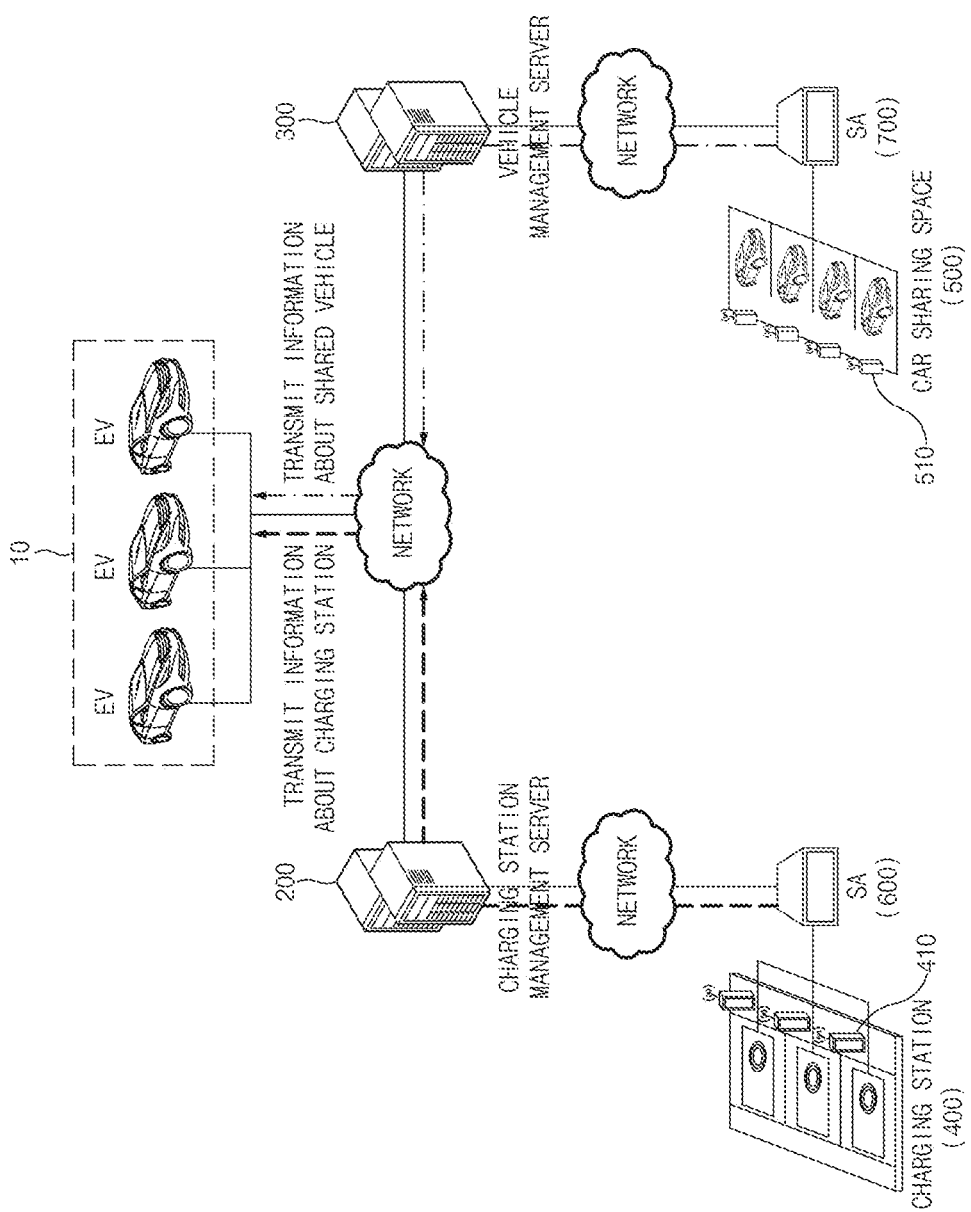
FIG. 5 is a drawing illustrating a process of sharing information about a charging station and information about a shared vehicle according to an embodiment of the present disclosure.

FIG. 5 is a drawing illustrating a process of sharing information about a charging station and information about a shared vehicle according to an embodiment of the present disclosure.

Referring to FIG. 5, a charging station management server 200 may collect information about a charging station from a charging station terminal 410 and may manage a charging type, a permitted voltage, or a permitted current of each of charging station terminals. When there is a request from an electric vehicle 10, the charging station management server 200 may transmit the collected information about the charging station to the electric vehicle 10. Furthermore, a vehicle management server 300 may collect information about a shared vehicle from a sharing space terminal 510, may manage a power state, a usage time, and the like of each of shared vehicles, and may transmit the collected information about the shared vehicle to the electric vehicle 10.

Figure 6:
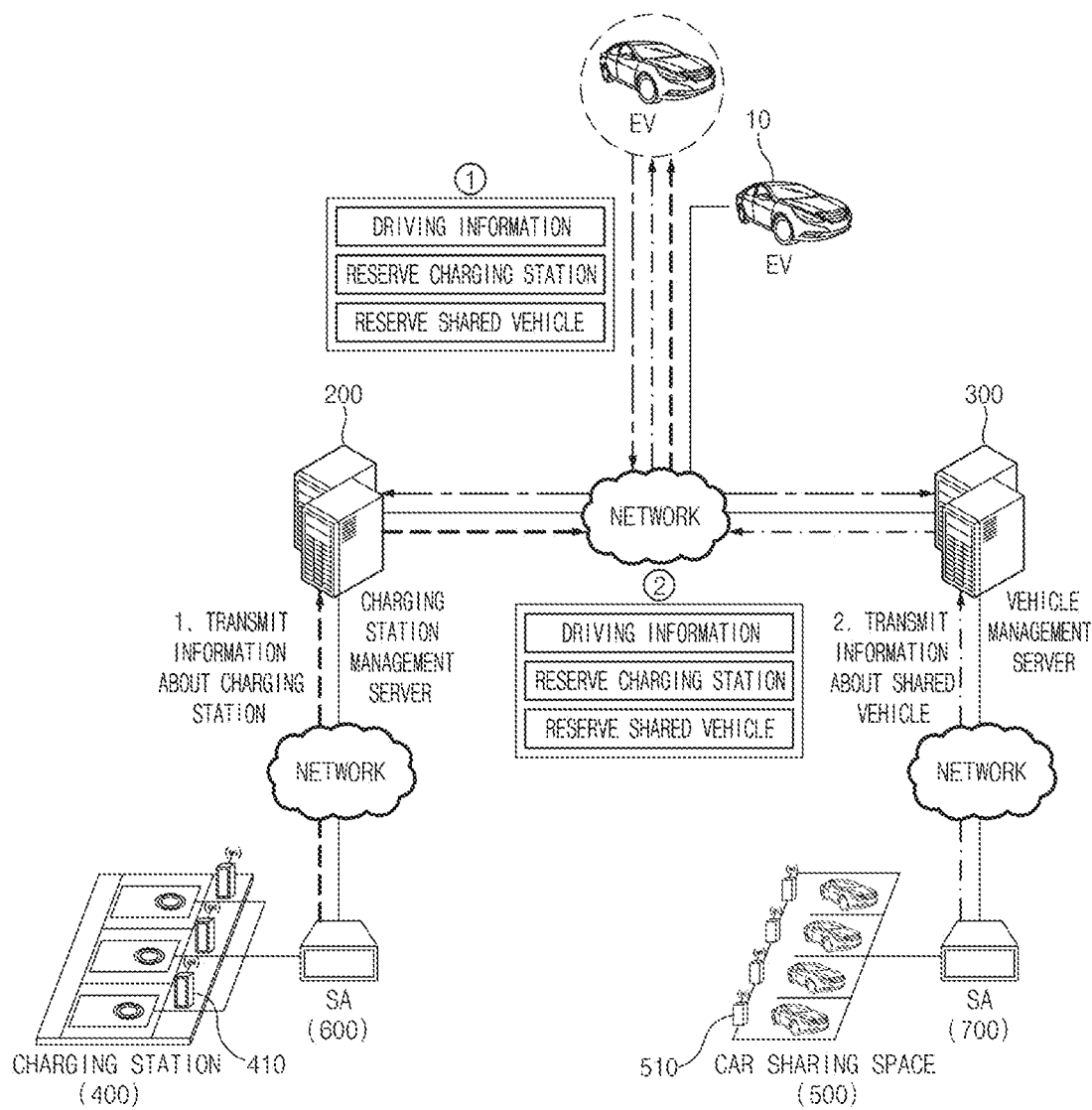
FIG. 6 is a drawing illustrating a process of reserving a charging station and a shared vehicle according to an embodiment of the present disclosure.

FIG. 6 is a drawing illustrating a process of reserving a charging station and a shared vehicle according to an embodiment of the present disclosure.

Referring to FIG. 6, when it is expected such that power to a destination is insufficient during operation, an electric vehicle 10 may transmit its driving information to a charging station management server 200 and a vehicle management server 300 and may request the charging station management server 200 and the vehicle management server 300 to reserve a charging station and a shared vehicle.

In this case, the charging station management server 200 and the vehicle management server 300 may receive the request of the electric vehicle 10 and may perform communication for reserving the charging station and the shared vehicle. The electric vehicle 10 may receive information about an available charging station and information about an available shared vehicle from the charging station management server 200 and the vehicle management server 300. The charging station management server 200 and the vehicle management server 300 may select an optimal charging station and an optimal shared vehicle, which are capable of being provided to the electric vehicle 10, based on the driving information received from the electric vehicle 10, may provide the electric vehicle 10 with information about the charging station and the information about the shared vehicle, and may reserve the charging station and the shared vehicle.

As such, an embodiment of the present disclosure may minimize a change in driving plan by linking a charging station and a shared vehicle based on driving information of the vehicle to select and reserve the charging station and the shared vehicle. Furthermore, an embodiment of the present disclosure may increase convenience of the user by causing the user to continuously move in an unexpected situation where power is insufficient such that the user moves to the destination without being stopped.

Figure 7:
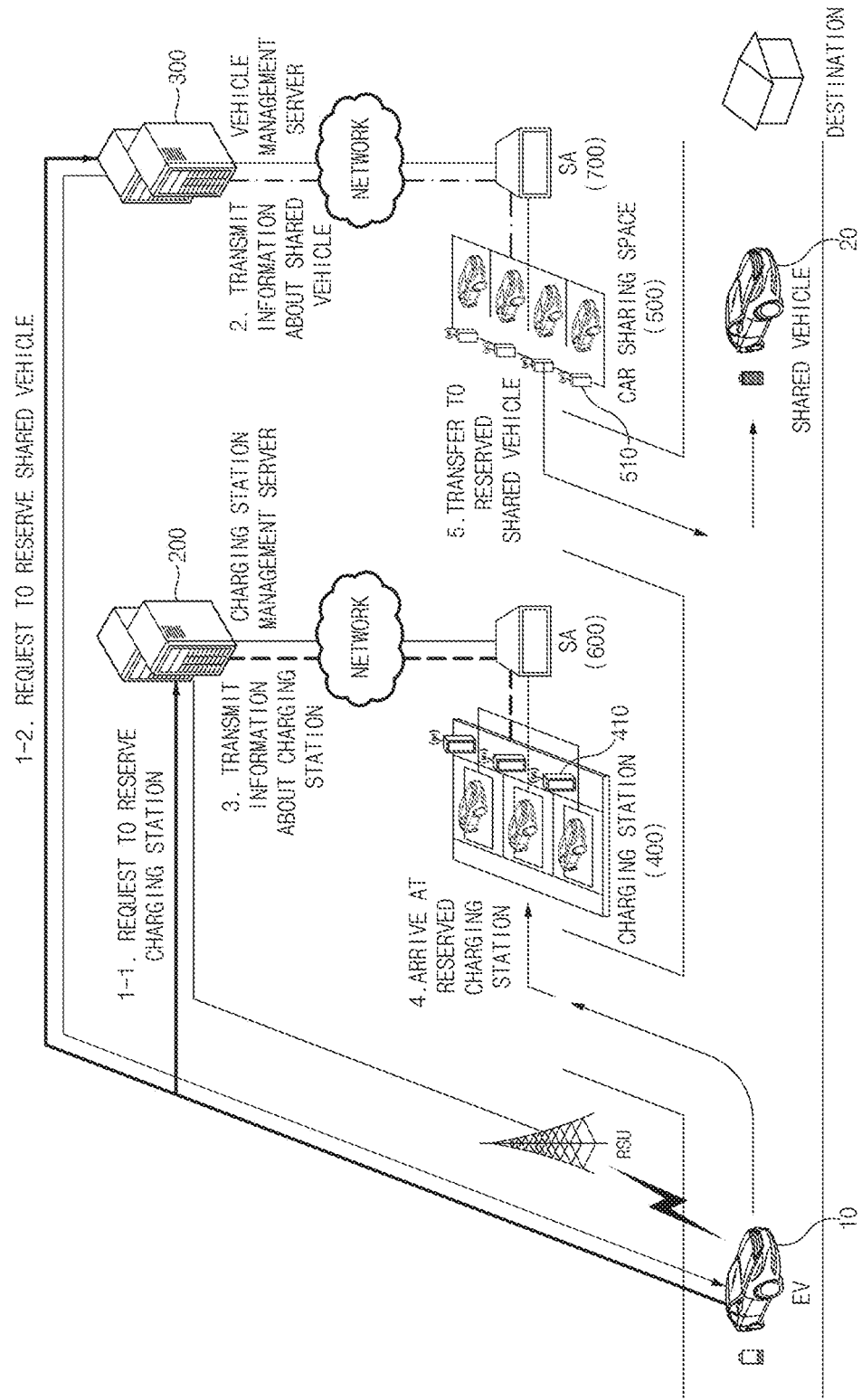
FIG. 7 is a drawing illustrating a process of continuing operation of an electric vehicle according to an embodiment of the present disclosure.

FIG. 7 is a drawing illustrating a process of continuing operation of an electric vehicle according to an embodiment of the present disclosure.

Referring to FIG. 7, an electric vehicle 10 may request a charging station management server 200 and a vehicle management server 300 to reserve a charging station and a shared vehicle. The charging station management server 200 and the vehicle management server 300 may collect and manage information about charging stations and information about shared vehicles, respectively, and may perform the reservation of a charging station and the reservation of a shared vehicle, which are requested from the electric vehicle 10. The charging station management server 200 and the vehicle management server 300 may provide the electric vehicle 10 with information about the reserved charging station and the reserved shared vehicle.

As another embodiment, the vehicle management server 300 may fail to provide the electric vehicle 10 with the information about the shared vehicle, and may share with the charging station management server 200 to provide a user with the information about the shared vehicle when the user arrives at the charging station.

Thus, the electric vehicle 10 may arrive at the reserved charging station to start to charge the electric vehicle 10, and the user may transfer to the reserved shared vehicle 20 to move to the destination using the shared vehicle 20. In this case, the electric vehicle 10 may notify the user of a charging power of the reserved shared vehicle 20, a number of the shared vehicle 20, a location of a car sharing space where the shared vehicle 20 is parked, and the like. Thus, the user may go to the shared vehicle 20 to ride in the shared vehicle 20 based on the notified information.

Figure 8:
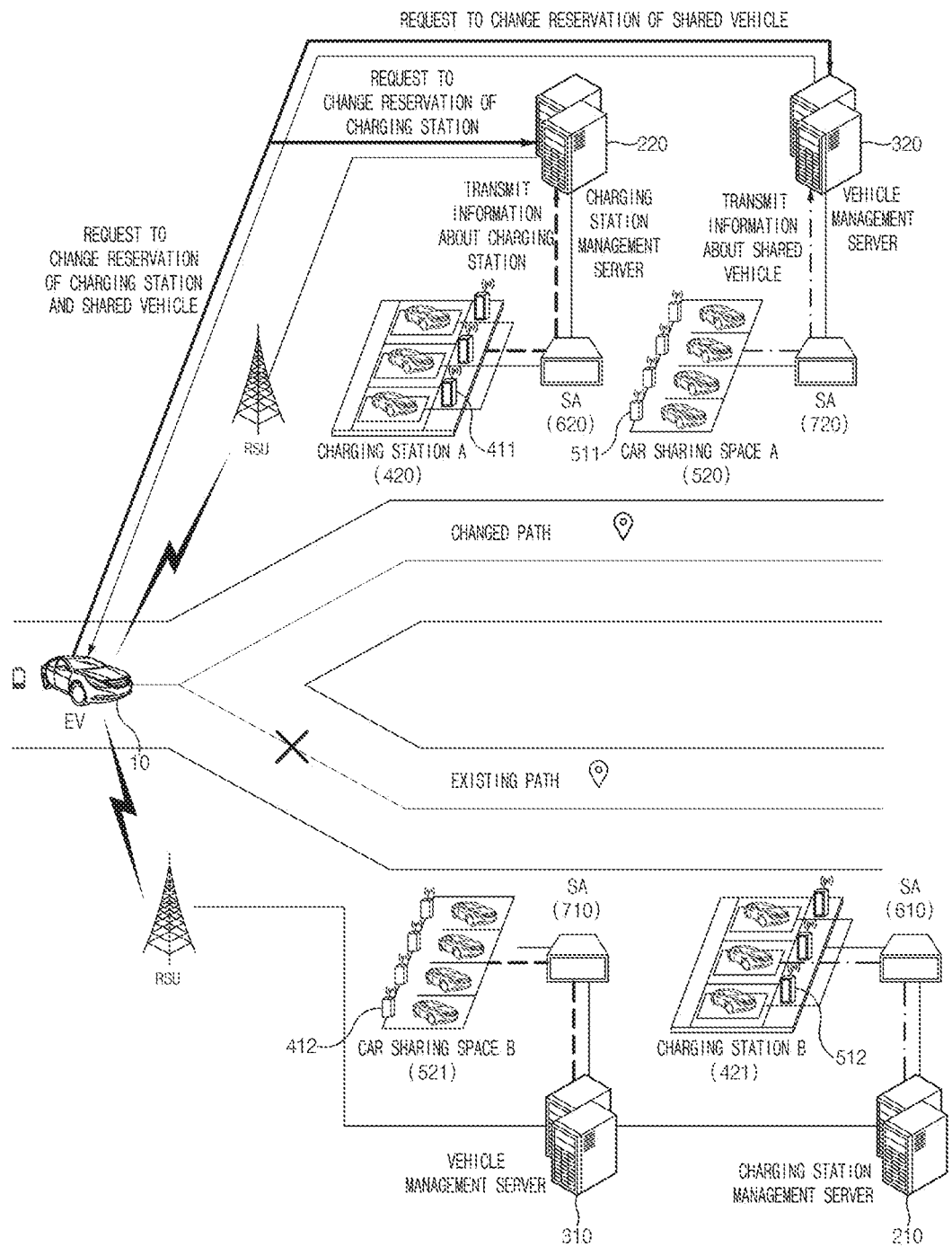
FIG. 8 is a drawing illustrating an exemplary operation of changing a path of an electric vehicle according to an embodiment of the present disclosure.

FIG. 8 is a drawing illustrating an exemplary operation of changing a path of an electric vehicle according to an embodiment of the present disclosure. Referring to FIG. 8, when an electric vehicle 10 desires to change a path depending on a change in destination, vehicle path, road environment, traffic volume, estimated time of arrival, battery state, information about a charging station, fee information, payment type, or information about a shared vehicle, it may request a charging station management server 200 and a vehicle management server 300 to cancel and change the reservation of the charging station or the shared vehicle. Thus, the charging station management server 200 and the vehicle management server 300 may collect information a new charging station and information about a new shared vehicle, respectively, and may select an optimal charging station and an optimal shared vehicle depending on the change in destination, vehicle path, road environment, traffic volume, estimated time of arrival, battery station, charging type, information about the charging station, information about the shared vehicle, fee information, or payment type information. In FIG. 8, when the electric vehicle 10 is traveling on an existing path, a session may be connected with a sharing space terminal 412 of car sharing space B 521 and a charging station terminal 512 of charging station B 421. However, when the electric vehicle 10 desires to change the path, it may communicate with a new charging station management server 220 and a new vehicle management server 320 to newly establish a session between a charging station terminal 411 of charging station A 420 and a sharing space terminal 511 of car sharing space A 520.

Figure 9:
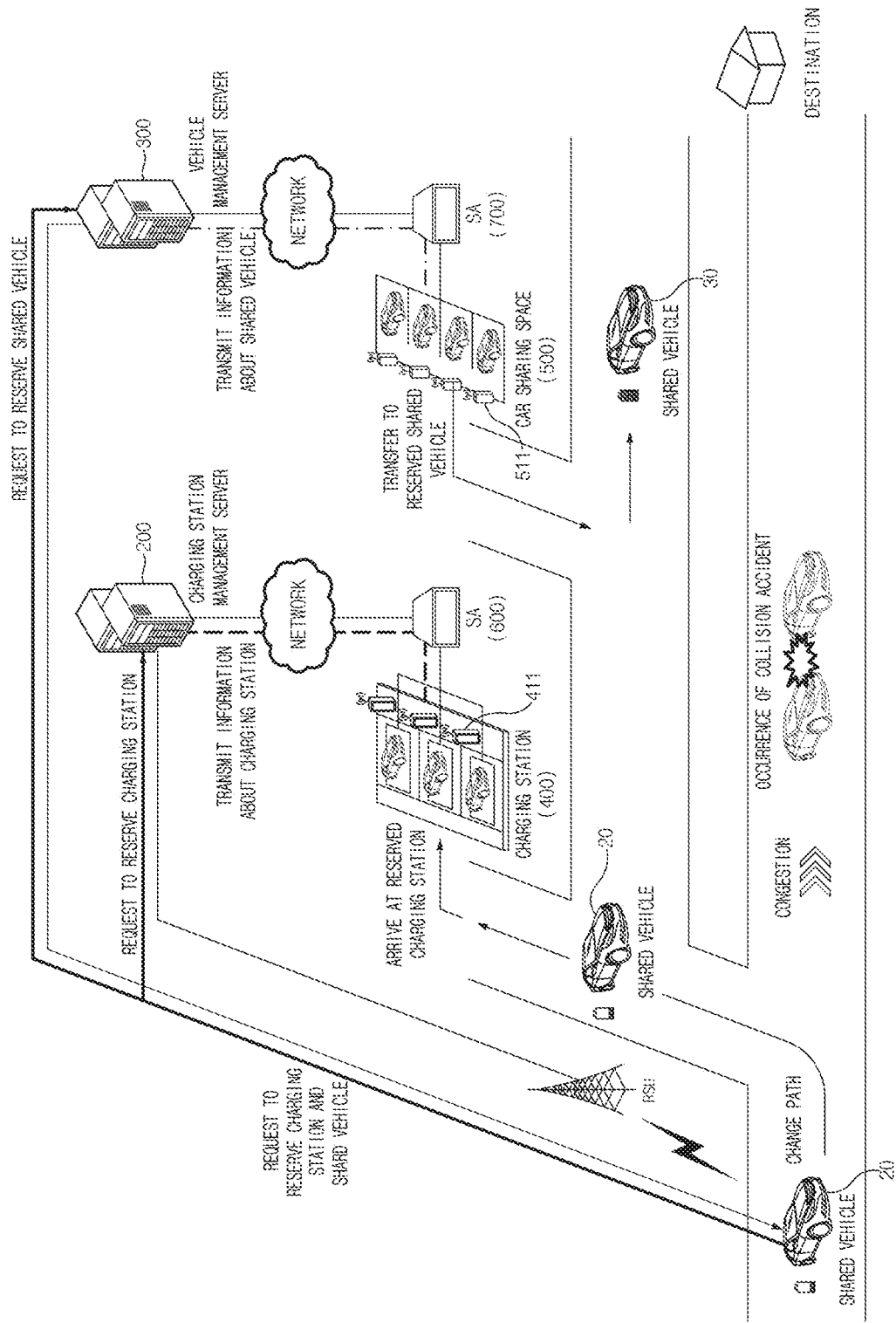
FIG. 9 is a drawing illustrating an exemplary operation of changing a shared vehicle according to an embodiment of the present disclosure.

FIG. 9 is a drawing illustrating an exemplary operation of changing a shared vehicle according to an embodiment of the present disclosure. Referring to FIG. 9, an example where a breakdown or a traffic accident occurs when a shared vehicle 20 is in use or an example where the shared vehicle 20 changes to a new shared vehicle 30 depending on a change in road environment is disclosed.

Figure 10:
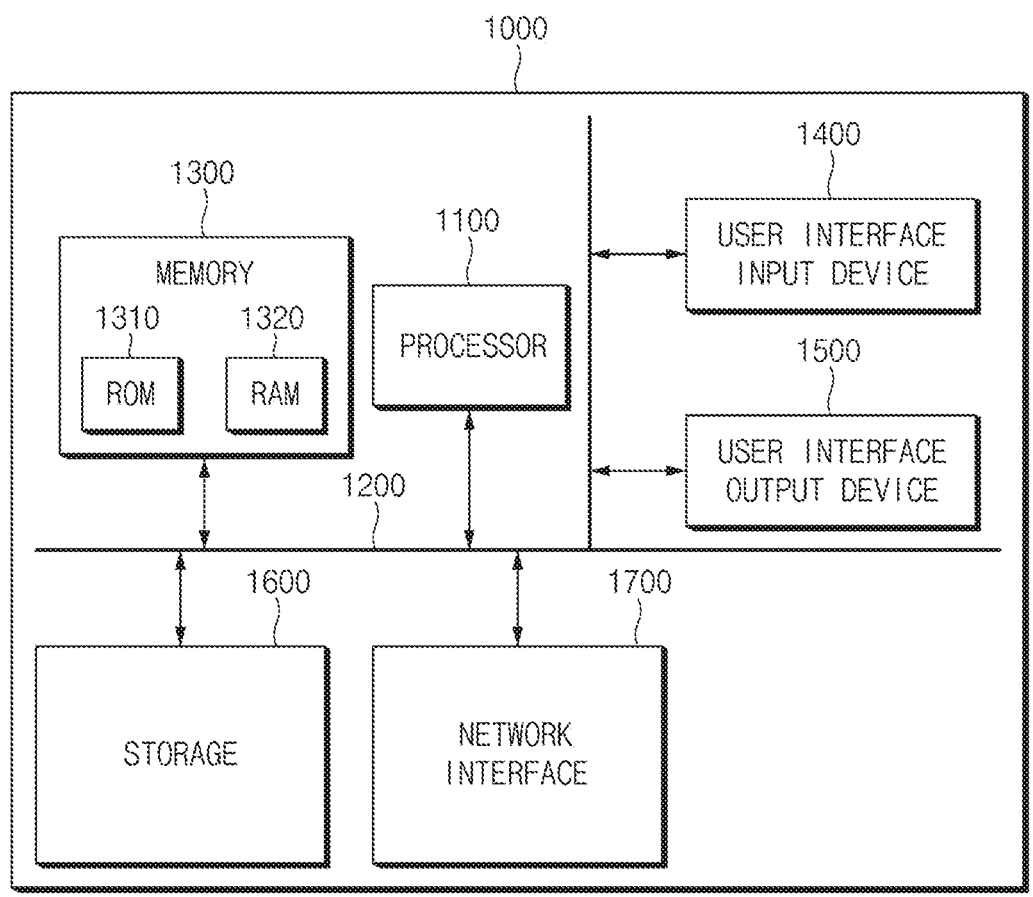
FIG. 10 is a block diagram illustrating a computing system according to an embodiment of the present disclosure.

FIG. 10 is a block diagram illustrating a computing system according to an embodiment of the present disclosure.

Referring to FIG. 10, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The present technology may increase convenience of the user by reserving a charging station and reserving a shared vehicle when a power of the electric vehicle is insufficient and causing the user to transfer to the reserved shared vehicle to move to the destination without waiting during a charging time.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

The invention claimed is:

1. A system for controlling charging of an electric vehicle, the system comprising:
   an apparatus for controlling charging of an electric vehicle, the apparatus comprising:
      a communication device configured to perform vehicle-to-everything (V2X) communication with a charging station management server outside the electric vehicle and a vehicle management server configured to manage shared vehicles;
      a processor configured to request that the charging station management server reserve a charging station via the communication device, and configured to automatically request that the vehicle management server reserve a shared vehicle to be used when the electric vehicle is charged, via the communication device, when a vehicle power for driving to a destination is insufficient; and
   the vehicle management server being configured to perform automatic reservation of the shared vehicle in a sharing space terminal when receiving the reservation of the shared vehicle from the apparatus for controlling charging of the electric vehicle, wherein the automatic reservation is performed based on a battery state of the shared vehicle;
   wherein the vehicle management server reserves the shared vehicle in a car sharing space within a predetermined distance from the charging station;
   wherein the processor is configured to establish a first session with a charging station terminal in the charging station to share information necessary for wireless charging; and;
   wherein the processor is configured to establish a second session with a reserved sharing space terminal in the car sharing space to share information about the shared vehicle with the reserved sharing space terminal.

2. The system of claim 1, wherein the processor transmits one of destination, a vehicle path, a road environment, traffic volume, an estimated time of arrival, a battery state, a charging type, information about the charging station, fee information, or payment type information to the charging station management server, requests the charging station management server to perform one of a reservation of the charging station, a change in the reservation of the charging station, or cancellation of the reservation of the charging station, and transmits one of the destination, the vehicle path, the road environment, the traffic volume, the estimated time of arrival, the battery state, the information about the shared vehicle, the fee information, or the payment type information to the vehicle management server.

3. The system of claim 1, wherein the processor requests the vehicle management server to perform one of a reservation of the shared vehicle, a change in the reservation of the shared vehicle, or cancellation of the reservation of the shared vehicle using one of the destination, a vehicle path, a road environment, traffic volume, an estimated time of arrival, a battery state, information about the shared vehicle, fee information, or a payment type.

4. The system of claim 1, wherein the processor performs path guidance or driving control to the reserved charging station when receiving information about a reservation of the charging station from the charging station management server.

5. The system of claim 1, wherein the processor establishes a session with a charging station terminal in the charging station to share information related to wireless charging, and wherein the processor shares the information related to the wireless charging with the charging station terminal through the established session.

6. The system of claim 5, wherein the processor shares charging state information with the charging station terminal when the electric vehicle arrives at the reserved charging station to charge the electric vehicle, and wherein the processor receives metering information from the charging station terminal.

7. The system of claim 1, wherein the processor establishes a session with a sharing space terminal in a car sharing space when receiving information about the shared vehicle from the vehicle management server, and wherein the processor shares the information about the shared vehicle with the sharing space terminal through the established session.

8. The system of claim 7, wherein the processor performs path guidance or driving control where the reserved car sharing space is the destination when receiving information about the reservation of the shared vehicle from the vehicle management server.

9. The system of claim 8, wherein the processor shares information about use of the shared vehicle, which arrives at the car sharing space, with the vehicle management server when the electric vehicle arrives at the car sharing space to change to the shared vehicle, and wherein the processor receives metering information from the vehicle management server.

10. A method for controlling charging of an electric vehicle, the method comprising:
   receiving a request to reserve a charging station from the electric vehicle at a processor;
   reserving the charging station based on driving information of the electric vehicle and information about the charging station;
   receiving a request to reserve a shared vehicle from an electric vehicle at a processor; and
   reserving the shared vehicle in a car sharing space within a predetermined distance from the charging station based on the driving information of the electric vehicle and information about the shared vehicle;

wherein the reserving of the shared vehicle includes:
periodically collecting information about shared vehicles;
selecting a shared vehicle based on the driving information and the information about the charging station when the driving information is received from the electric vehicle; and
sharing information about the selected shared vehicle with the electric vehicle or a charging station.

11. The method of claim 10, wherein the reserving of the charging station includes:
periodically collecting information about charging stations;
selecting a charging station terminal based on the driving information and the information about the charging station when the driving information is received from the electric vehicle; and
providing the electric vehicle with information about the selected charging station terminal.

12. The method of claim 10, further comprising:
automatically changing or canceling the reservation of the charging station depending on one of a destination, a vehicle path, a road environment, traffic volume, an estimated time of arrival, a battery state, a charging type, information about the charging station, fee information, or a payment type.

13. The method of claim 10, further comprising:
automatically changing or canceling the reservation of the shared vehicle depending on one of a destination, a vehicle path, a road environment, traffic volume, an estimated time of arrival, a battery state, information about the shared vehicle, fee information, or a payment type.

* * * * *